US006994892B2

(12) United States Patent
Katayama et al.

(10) Patent No.: US 6,994,892 B2
(45) Date of Patent: Feb. 7, 2006

(54) METHOD OF MANUFACTURING OPTICAL RECORDING MEDIUM

(75) Inventors: Kazutoshi Katayama, Kanagawa (JP); Hiroshi Kubo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 257 days.

(21) Appl. No.: 10/374,522

(22) Filed: Feb. 27, 2003

(65) Prior Publication Data

US 2003/0164221 A1 Sep. 4, 2003

(30) Foreign Application Priority Data

Feb. 28, 2002 (JP) ............................ 2002-053389

(51) Int. Cl.
*B05D 1/18* (2006.01)
*G11B 7/26* (2006.01)

(52) U.S. Cl. .............................. 427/430.1; 156/272.2; 156/278

(58) Field of Classification Search ............ 156/272.2, 156/275.5, 275.7, 278; 427/169, 430.1; 428/64.2, 428/64.4, 65.2, 64.7
See application file for complete search history.

(56) References Cited

U.S. PATENT DOCUMENTS

| | | | | |
|---|---|---|---|---|
| 4,891,305 | A * | 1/1990 | Oba et al. | 430/270.18 |
| 6,063,467 | A * | 5/2000 | Kanno | 428/64.1 |
| 6,582,793 | B2 * | 6/2003 | Kondo | 428/64.1 |

FOREIGN PATENT DOCUMENTS

| | | |
|---|---|---|
| JP | 57-007280 | 1/1982 |
| JP | 59-042060 | 3/1984 |
| JP | 05-258346 A | 10/1993 |
| JP | 08-106650 A | 4/1996 |
| JP | 11-138088 A | 5/1999 |
| JP | 11-296921 A | 10/1999 |
| JP | 2000-262959 | 9/2000 |
| JP | 2000-289341 | 10/2000 |
| JP | 2001-155379 | 6/2001 |

OTHER PUBLICATIONS

Japanese Office Action dated Feb. 15, 2005.

* cited by examiner

*Primary Examiner*—John T. Haran
(74) *Attorney, Agent, or Firm*—Sughrue Mion, PLLC

(57) ABSTRACT

A method of manufacturing an optical information recording medium is provided with the steps of: immersing a substrate having guide grooves formed on both surfaces thereof into a recording-layer forming solution; raising the substrate from the recording-layer forming solution; and drying the substrate thus raised to form recording layers on both of the surfaces of the substrate.

19 Claims, 4 Drawing Sheets

A — A′

B — B′

METHOD OF MANUFACTURING OPTICAL RECORDING MEDIUM

BACKGROUND OF THE INVENTION

1. Field of the Invention

The present invention relates to a method of manufacturing an optical information recording medium, and more specifically to a method of manufacturing an optical information recording medium having recording layers formed on both sides thereof.

2. Description of the Related Art

CD-R's (Compact Disc-recordable), CD-ROM's (Compact Disc), DVD-ROM's (digital versatile disc), DVD-R's (digital versatile disc-recordable), DVD-RW's and the like are known a disc-shaped recording media (optical information recording media) on which information is recorded from which information is and reproduced by using a laser light beam.

An optical information recording medium of this type comprises a substrate and a recording layer formed thereon, and as a method of forming this recording layer, a method of applying a recording-layer forming solution prepared by dissolving an organic pigment in an organic solvent onto the substrate through a spin coating method is generally known. This spin coating method requires no facilities such as a vacuum chamber, and makes it possible to form a recording layer with comparative ease.

However, along with recent developments in optical information recording media, a system has been proposed, such as that of Data Play disks, in which a certain amount of information is recorded on both of the sides of a small-diameter disk. Under such circumstances, the above-mentioned spin coating method results in a problem of an increase in relative liquid loss since the disk has a small coating area. Moreover, since the coating can be carried out on only one surface at a time in the spin coating method, this method results in deterioration of production efficiency upon manufacturing an optical information recording medium having recording layers on both surfaces. Furthermore, in the spin coating method for coating only one surface at a time, when coating the other surface after coating one surface, coating has to be carried out on the other surface so as not to damage the coated surface. It is therefore necessary to carry out these processes with high precision, and defective products are sometimes generated.

SUMMARY OF THE INVENTION

The present invention has been devised to solve the above-mentioned problems, and an object thereof is to provide a method of manufacturing an optical information recording medium which can efficiently produce an optical information recording medium having recording layers formed on both of the surfaces in a stable manner.

A first embodiment of the present invention is a method of manufacturing an optical information recording medium, the method comprising the steps of: immersing a substrate having guide grooves formed on both surfaces thereof into a recording-layer forming solution; raising the substrate from the recording-layer forming solution; and drying the substrate thus raised to form recording layers on both of the surfaces of the substrate.

A second embodiment of the present invention is the method of manufacturing an optical information recording medium, according to the first embodiment, wherein the substrate has a diameter of not more than 80 mm.

A third embodiment of the present invention is the method of manufacturing an optical information recording medium, according to the first embodiment, wherein the substrate is subjected to the immersing, raising and drying processes while being held in a panel which can house a plurality of substrates.

A fourth embodiment of the present invention is the method of manufacturing an optical information recording medium, according to the first embodiment, wherein the raising and drying processes are carried out in a solvent atmosphere of the recording-layer forming solution.

A fifth embodiment of the present invention is the method of manufacturing an optical information recording medium, according to the fourth embodiment, wherein a concentration of the solvent atmosphere is 0.1 to 90%.

A sixth embodiment of the present invention is the method of manufacturing an optical information recording medium, according to the first embodiment, wherein a raising speed of the substrate is not more than 10 mm/s.

A seventh embodiment of the present invention is the method of manufacturing an optical information recording medium, according to the first embodiment, wherein the recording-layer forming solution contains an organic pigment in an amount of not more than 10 mass % with respect to a solvent.

An eighth embodiment of the present invention is the method of manufacturing an optical information recording medium, according to the seventh embodiment, wherein the organic pigment is selected from the group consisting of triazole, triazine, cyanine, merocyanine, aminobutadiene, phthalocyanine, cinnamic acid, viologen, azo, oxonole benzoxazole, benztriazole and anthraquinone.

A ninth embodiment of the present invention is the method of manufacturing an optical information recording medium, according to the first embodiment, wherein the substrate contains at least one material selected from the group consisting of glass, polycarbonate, acrylic resin, vinylchloride-based resin, epoxy resin, amorphous polyolefin and polyester.

A tenth embodiment of the present invention is the method of manufacturing an optical information recording medium, according to the first embodiment, wherein a substrate has a thickness in a range of 0.7 to 1.3 mm.

An eleventh embodiment of the present invention is the method of manufacturing an optical information recording medium, according to the first embodiment, wherein a solvent of the recording-layer forming solution is selected from the group consisting of methanol, ethanol, isopropyl alcohol, octafluoropentanol, allyl alcohol, methyl cerosolve, ethyl cerosolve, tetrafluoropropanol, hexane, heptane, octane, decane, cyclohexane, methyl cyclohexane, ethyl cyclohexane dimethyl cyclohexane, toluene, xylene, benzene, carbon tetrachloride, chloroform, tetrachloroethane, dibromoethane, diethyl ether, dibutyl ether, diisopropyl ether, dioxane, acetone, 3-hydroxy-3-methyl-2-butanone, ethyl acetate, methyl lactate and water.

A twelfth embodiment of the present invention is the method of manufacturing an optical information recording medium, according to the first embodiment, wherein the recording layer contains a binder selected from the group consisting of gelatin, cellulose derivatives, dextran, rosin, rubber, polyurethane, polyethylene, polypropylene, polystyrene, polyisobutylene, polyvinyl chloride, polyvinylidene chloride, a copolymer of polyvinyl chloride-polyvinyl acetate, polymethyl acrylate polymethyl methacrylate, polyvinyl alcohol, chlorinated polyethylene, epoxy resin, butyral resin, rubber derivatives and phenol-formaldehyde resin.

A thirteenth embodiment of the present invention is the method of manufacturing an optical information recording medium, according to the twelfth embodiment, wherein the binder is in an amount of 0.2 to 20 parts by mass with respect to 100 parts by mass of the organic pigment in the recording layer.

A fourteenth embodiment of the present invention is the method of manufacturing an optical information recording medium, according to the first embodiment, further comprising the step of forming a reflective layer on each of the both surfaces of the substrate having guide grooves formed thereon by a sputtering method or an ion-plating method.

A fifteenth embodiment of the present invention is the method of manufacturing an optical information recording medium, according to the fourteenth embodiment, further comprising the step of forming a reflective layer on each of the both surfaces of the substrate having guide grooves formed thereon by a sputtering method or an ion-plating method.

A sixteenth embodiment of the present invention is the method of manufacturing an optical information recording medium, according to the fourteenth embodiment, wherein the reflective layer has a thickness in a range of 20 to 500 nm.

A seventeenth embodiment of the present invention is the method of manufacturing an optical information recording medium, according to the first embodiment, further comprising the steps of: laminating dummy substrates on both of the surfaces of the substrate having the recording layers formed thereon, to form a disc laminated body; and irradiating the disc laminated body with ultraviolet rays so that the substrate having the recording layers formed thereon and the dummy substrates are bonded to each other.

An eighteenth embodiment of the present invention is the method of manufacturing an optical information recording medium, according to the seventeenth embodiment, wherein the dummy substrate contains at least one of polycarbonate and cellulose triacetate.

A nineteenth embodiment of the present invention is the method of manufacturing an optical information recording medium, according to the fourteenth embodiment, further comprising the step of forming a heat-resistant protective layer on a surface of at least one of the reflective layers.

DESCRIPTION OF THE PREFERRED EMBODIMENTS

A method of manufacturing an optical information recording medium of the present invention comprises a step of immersing a substrate having guide grooves formed on both surfaces thereof into a recording-layer forming solution, a step of raising the above-mentioned immersed substrate from the above-mentioned recording-layer forming solution, and a step of drying the substrate thus raised to form recording layers on both of the surfaces of the above-mentioned substrate.

Referring to Figures, the following description will discuss preferred embodiments of an optical recording medium of the invention.

Figure 1:
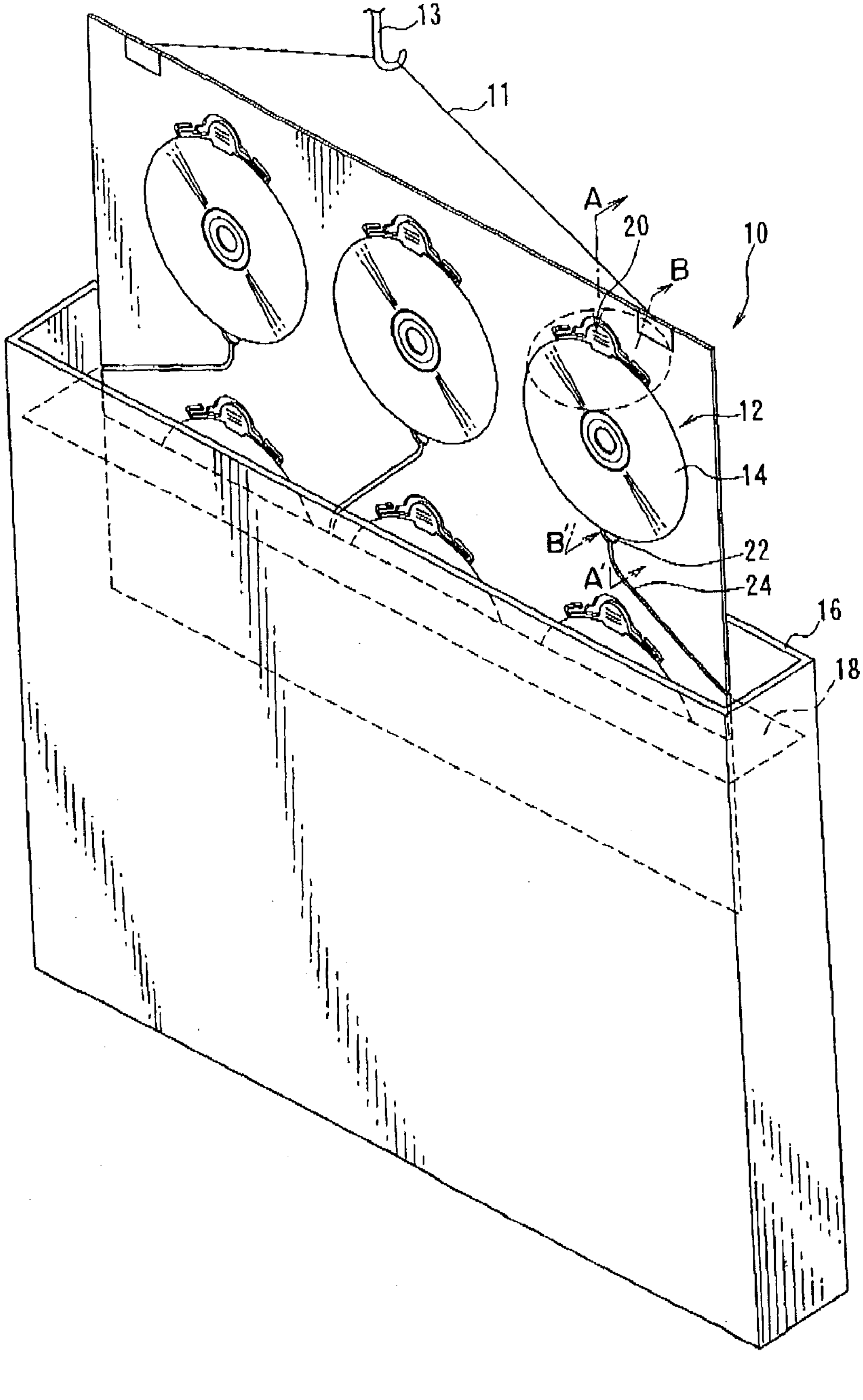
FIG. 1 is a perspective view of a device to be used in a method of manufacturing an optical information recording medium in accordance with an embodiment of the present invention.

In the method of manufacturing an optical information recording medium of one embodiment of the invention, as shown in FIG. 1, first, a substrate 14, held in a housing unit 12 of a panel 10, is immersed in a recording-layer forming solution 18 inside a container 16 so as to form recording layers on both of the surfaces of the substrate 14 (immersing process). Next, the substrate 14 thus immersed is raised together with the panel 10, and dried to form recording layers on both of the surfaces of the substrate 14 (hereinafter, the substrate having the recording layers formed thereon is referred to as "recording substrate") (raising-drying process).

As shown in FIG. 1, a housing unit 12, which has virtually a round shape in its front view on the Figure, is installed in the panel 10 made from a material such as metal and resin, and is allowed to house a plurality of or a number of substrates 14. End portions of a wire 11 are fixedly secured to both of the sides on the upper portion of the panel 10, with the center of this wire 11 is hooked on a hooking member 13. This hooking member 13 is raised and lowered by using a hoist machine or the like not shown; thus, the panel 10 is immersed into the recording-layer forming solution 18, or raised therefrom.

Figure 2A:
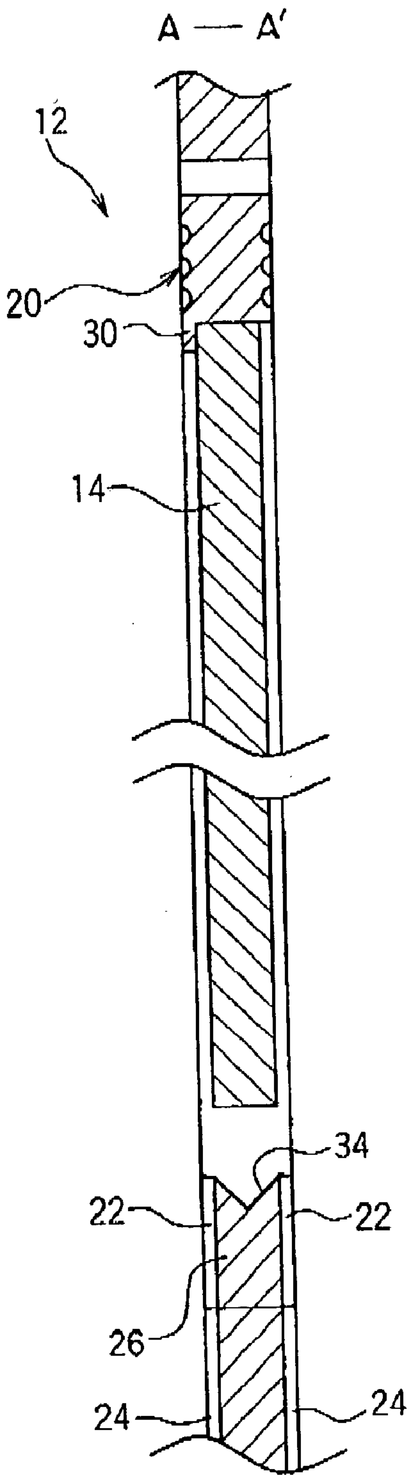
FIG. 2A is a partial cross-sectional view taken along line A–A' of the panel, which explains an attaching process of the substrate to the panel to be used for the method of manufacturing the optical information recording medium according to the embodiment of the invention.
Figure 2B:
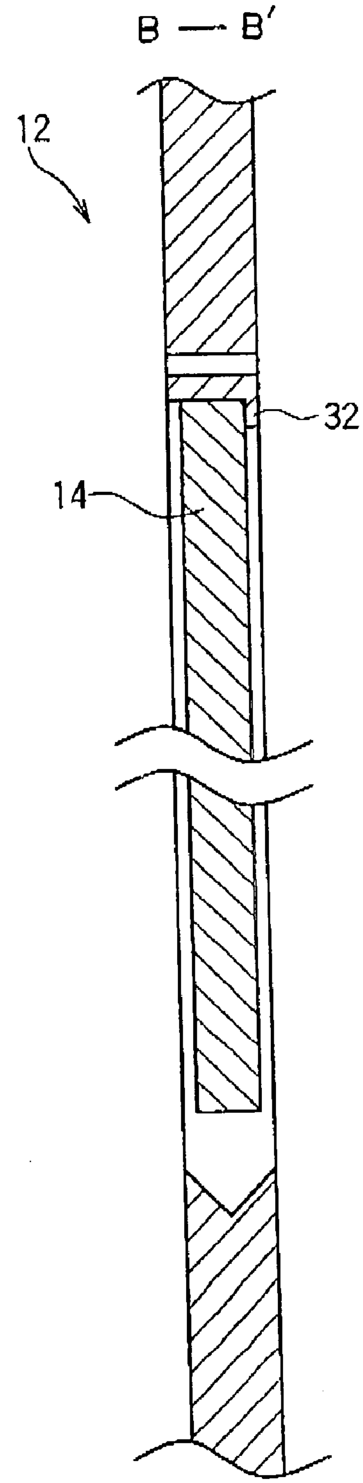
FIG. 2B is a partial cross-sectional view taken along line B–B' of the panel, which explains an attaching process of the substrate to the panel to be used for the method of manufacturing the optical information recording medium in accordance with the embodiment of the invention.
Figure 3A:
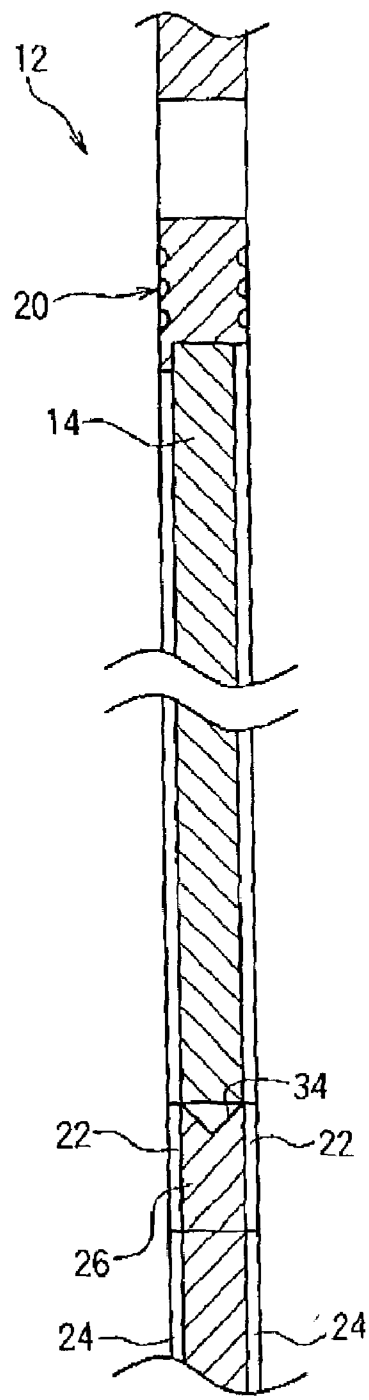
FIG. 3A is a partial cross-sectional view taken along line A–A' of the panel, when the substrate is attached to the panel to be used for the method of manufacturing the optical information recording medium in accordance with the embodiment of the invention.
Figure 3B:
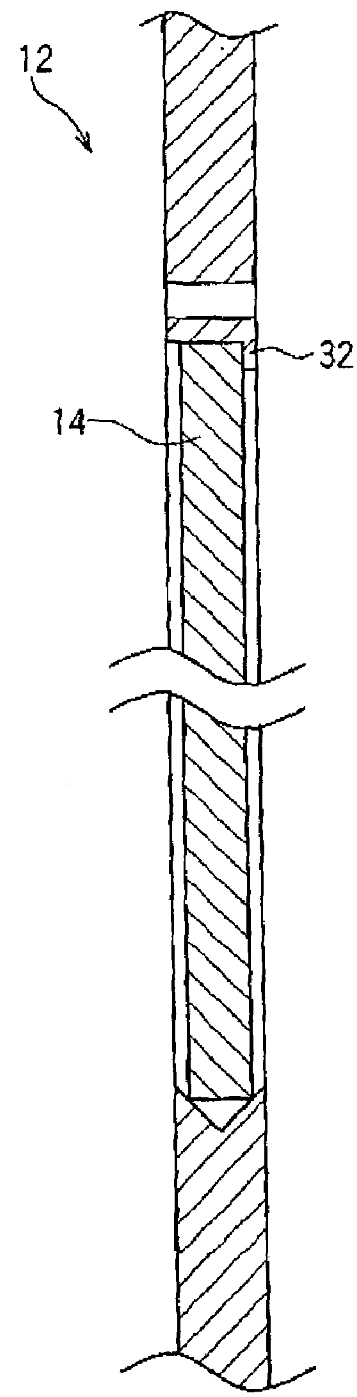
FIG. 3B is a partial cross-sectional view taken along line B–B' of the panel, when the substrate is attached to the panel to be used for the method of manufacturing the optical information recording medium according to the embodiment of the invention.

Moreover, as shown in FIGS. 1 to 3, a holding member 20, which stops the substrate 14, is installed on the upper portion of the housing unit 12. Furthermore, a solution pool 22, which has virtually a semi-circular shape in the front view on the Figures, is placed on the surface and rear-face of the panel through a wall 26 on the lower portion of the housing unit 12 so that the recording-layer forming solution 18, which is allowed to drop down over the surface of the substrate 14 when the substrate 14 is raised, is applied thereon. This solution pool 22 is provided with a guide groove 24 that extends to ends of the panel 10 to direct the recording-layer forming solution 18 stored in the solution pool 22 outside the panel 10.

Figure 4:
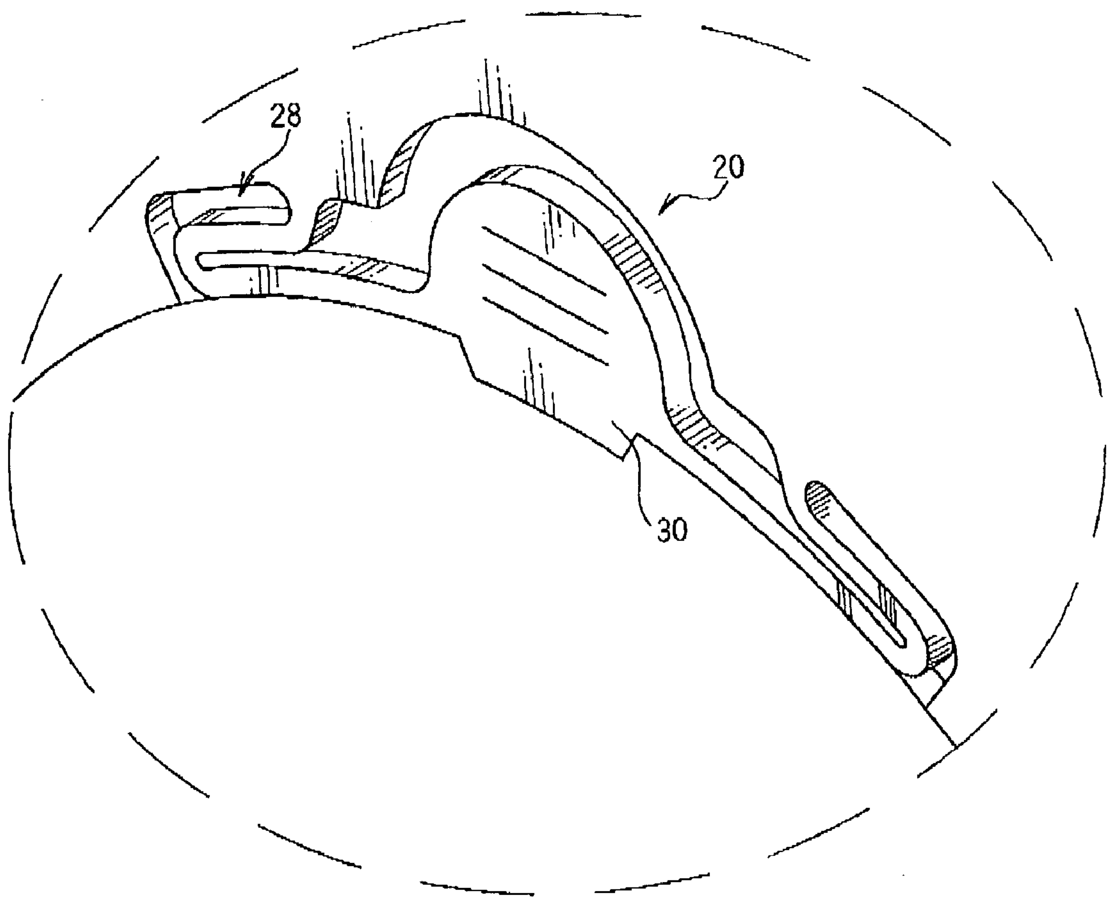
FIG. 4 is an enlarged view of a portion indicated by a broken line in FIG. 1.

As shown in FIG. 4, the holding member 20 is provided with an elastic portion 28 formed into a U-letter shape so that, by utilizing the elastic property of this elastic portion 28 exerted upward and downward (on the Figure), the substrate 14 is held in the housing unit 12. In other words, the peripheral portion of the substrate 14 is pressed onto the inner peripheral wall of the housing unit 12 by the restoring force of the elastic portion 28 that is exerted after the holding member 20 has been raised upward, and maintained thereon.

Moreover, a protruding portion 30 is formed in the center of the holding member 20, and protruding portions 32 are formed on the rear side of the panel 10 through the substrate 14 on both of the right and left sides of the protruding portion 30. Here, the lower half of the panel that corresponds to a portion without the holding member 20 on the peripheral portion of the housing unit 12 is provided with a V-letter groove 34 used for holding the substrate 14. These protruding portions 30, 32, and the V-letter groove 34 support the substrate 14 from the surface and rear-face sides of the panel 10 to prevent the substrate 14 housed in the housing unit 12 from coming off.

In the housing process of the substrate 14 into the housing unit 12 of the panel 10, first, the holding member 20 is pushed by the peripheral portion of the substrate 14 to direct the substrate 14 into the housing unit 12 (see FIG. 2). After the substrate 14 has been directed, the substrate 14 is released so that the restoring force of the holding member 20 is allowed to press the substrate 14 so that the peripheral portion of the substrate 14 is pressed onto the inner circumferential wall of the housing unit 12; thus, the substrate 14 is held in the housing unit 12 (see FIG. 3). In this state, the panel 10 is immersed into the recording-layer forming solution 18.

After the panel 10 has been immersed, the panel 10 is raised. When the panel 10 is raised, the recording-layer forming solution 18 that is dropping down the surface of the substrate 14 is introduced into the solution pool 22 so that the recording-layer forming solution 18 that has been introduced into the solution pool 22 is discharged out of the panel 10 through the guide groove 24. Here, as shown in FIG. 3A, since the lower end of the substrate 14 is made in contact with one portion (wall 26) of the housing unit 12, the recording-layer forming solution 18 is introduced into the solution pool 22 stably without residual recording-layer forming solution 18 on the lower end portion of the substrate 14.

Moreover, since the recording-layer forming solution 18 is directed along the guide grooves 24, it is possible to prevent the recording-layer forming solution 18 from dropping down to a substrate 14 housed on the lower side from the corresponding substrate 14 on the upper side (for example, to the substrate 14 housed in the housing unit 12 on the second stage from the top of the panel 10, with respect to the substrate 14 housed in the housing unit 12 on the first stage from the top of the panel 10); thus, it becomes possible to form a recording layer on the optical information recording medium in a stable manner.

Here, the drying process of the recording-layer forming solution 18 is carried out, with the substrate 14 being housed in the panel 10 without the necessity of taking the substrate 14 out of the panel 10, so that this process is advantageous in production.

Furthermore, the above-mentioned substrate is formed by, for example, an extrusion molding process, with guide grooves for use in tracking or the like being formed on both of the sides thereof. Here, if necessary, a reflection layer, made from a material containing Au, Ag, Al, Cu or the like, is formed on each of the two faces having guide grooves by using a sputtering or ion-plating method.

This substrate is preferably designed to have a diameter of not more than 80 mm. Even when the diameter is set to not more than 80 mm so as to make the optical information recording medium compacter, it is possible to sufficiently maintain the amount of information in the optical information recording medium having recording layers on both of the surfaces thereof.

The above-mentioned recording-layer forming solution preferably contains an organic pigment which will be described later at a rate of not more than 10 mass % with respect to the solvent, more preferably, not more than 5 mass %, most preferably, in the range of from 0.1 to 3 mass %. By setting the content of the organic pigment to not more than 10 mass % with respect to the solvent, it becomes possible to provide a recording-layer forming solution having a superior coating property. Additionally, with respect to the solvent, organic pigment and the like, detailed descriptions will be given later.

The above-mentioned raising process is preferably carried out in the solvent atmosphere of the recording-layer forming solution. Here, the concentration of the atmosphere (the rate of the solvent with respect to the saturated vapor pressure) is preferably set to 0.1 to 90%, more preferably, 0.5 to 85%. The raising process (and drying process) is carried out in the atmosphere within the above-mentioned range so that it is possible to form a thin-film (recording layer) without irregularities in a stable manner.

Moreover, upon raising the substrate, the raising rate thereof is preferably set to not more than 10 mm/s, more preferably, not more than 5 mm/s, most preferably, 0.1 to 3 mm/s. The raising rate is set to not more than 10 mm/s so that it is possible to achieve an appropriate thickness of the recording layer.

By forming recording layers of an optical information recording medium as described above, it becomes possible to form recording layers on both of the surfaces of the substrate simultaneously in a stable manner. Moreover, the application of the panel makes it possible to form recording layers on a plurality of substrates at one time. Therefore, it becomes possible to manufacture optical information recording media efficiently in a stable manner.

With respect to the substrate thus formed, since the recording layers are placed on both of the sides of the recording substrate, it is preferable to prepare two dummy substrates so as to laminate these dummy substrates on both of the surfaces of the recording substrate. The dummy substrates are made from resin, such as polycarbonate, and molded through injection molding or the like.

With respect to the lamination method of the dummy substrate, for example, first, a recording substrate is set in a spin coater, and an ultraviolet ray curable bonding agent is evenly spread over one of the surfaces of the recording substrate. Successively, the dummy substrate is laminated through the ultraviolet ray curable bonding agent to form a disc laminated body. This disc laminated body is preferably irradiated with ultraviolet rays by using a pulse-type ultraviolet-ray irradiation device so that the ultraviolet ray curable bonding agent injected between the substrates are cured to bond the recording substrate and the dummy substrate to each other. In the same manner, a dummy substrate is also bonded to the other surface of the recording layer.

As described above, an optical information recording medium having recording layers on both of the sides thereof is manufactured.

The following description will discuss the recording substrate and the dummy substrate constituting the optical information recording medium manufactured by the method of the invention.

The recording substrate to be manufactured by the method of the invention is not particularly limited, as long as at least recording layers are formed on both of the surfaces of a substrate having guide grooves formed on both of the surfaces thereof. Moreover, the dummy substrate is not particularly limited, as long as the substrate is joined to the recording substrate through an ultraviolet-ray curable bonding agent or the like.

Recording Substrate

<Substrate>

With respect to the material of the substrate, examples thereof include: glass; polycarbonate; acrylic resins such as polymethyl methacrylate; vinyl chloride based resins such as polyvinyl chloride and a polyvinyl chloride co-polymer; epoxy resins; amorphous polyolefin; and polyester. Some of these materials may be used in combination, if necessary. Among the above-mentioned materials, polycarbonate is preferably used from the viewpoint of wet endurance, dimensional stability, low price and the like. The thickness of the substrate is generally set in the range of from 0.4 to 1.5 mm, more preferably, 0.7 to 1.3 mm.

<Recording Layer>

With respect to materials forming a recording layer capable of recording and reproducing through a laser beam, any material may be used as long as it is dissolved in an organic solvent and processed by a dip coating method, and an organic compound is preferably used. More specifically, with respect to the organic compound, those dyes, disclosed in Japanese Patent Applications Laid-Open (JP-A) Nos. 4-74690, 8-127174, 11-53758, 11-334204, 11-334205, 11-334206, 11-334207, 2000-43423, 2000-108513, and 2000-158818, or materials, such as triazole, triazine, cyanine, merocyanine, aminobutadiene, phthalocyanine, cinnamic acid, viologen, azo, oxonole benzoxazole, benztriazole and anthraquinone, may be preferably used.

With respect to the solvent upon application of an organic compound (organic pigment), those materials that would not damage the substrate are preferably selected, and examples thereof include: alcohol solvents, such as methanol, ethanol, isopropyl alcohol, octafluoropentanol, allyl alcohol, methyl cerosolve, ethyl cerosolve and tetrafluoropropanol, aliphatic or alicyclic hydrocarbon-based solvents such as hexane, heptane, octane, decane, cyclohexane, methyl cyclohexane, ethyl cyclohexane and dimethyl cyclohexane; aromatic hydrocarbon-based solvents such as toluene, xylene and benzene; halogenated hydrocarbon-based solvents such as carbon tetrachloride, chloroform, tetrachloroethane and dibromoethane; ether solvents such as diethyl ether, dibutyl ether, diisopropyl ether and dioxane; ketone solvents such as acetone and 3-hydroxy-3-methyl-2-butanone; ester solvents such as ethyl acetate and methyl lactate; and water. These materials may be used alone, or a plurality of these may be used as a mixed solvent.

With respect to a method for dissolving the above-mentioned organic compound and the like, a method such as an ultrasonic-wave process may be used. Moreover, various additives such as an antioxidant, a UV-absorbent, a plasticizer and a lubricant may be added to the recording-layer forming solution in accordance with the objectives.

With respect to the binder, examples thereof include: natural organic polymer substances such as gelatin, cellulose derivatives, dextran, rosin and rubber; and synthetic organic polymers including hydrocarbon-based resins such as polyurethane, polyethylene, polypropylene, polystyrene and polyisobutylene, vinyl-based resins such as polyvinyl chloride, polyvinylidene chloride and copolymer of polyvinyl chloride-polyvinyl acetate, acrylic resins such as polymethylacrylate and polymethylmethacrylate, and initial condensates of heat-curable resins such as polyvinyl alcohol, chlorinated polyethylene, epoxy resin, butyral resin, rubber derivatives and phenol-formaldehyde resin.

In the case when a binder is used in combination as a material of the recording layer, the amount of use of the binder is generally set in the range of from 0.2 to 20 parts by mass, preferably, 0.5 to 10 parts by mass, more preferably, 1 to 5 parts by mass, with respect to 100 parts by mass of the organic compound. It becomes possible to improve the preservation stability of the recording layer by allowing the recording layer to contain the binder.

Various anti-fading agents may be added to the recording layer in order to improve the light resistance of the recording layer.

With respect to the anti-fading agent, a singlet oxygen quencher is generally used. With respect to the singlet oxygen quencher, those already disclosed in publications such as known patent specifications may be used.

Specific examples thereof include those agents disclosed in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492, Japanese Patent Application Publications (JP-B) Nos. 1-38680 and 6-26028, German Patent No. 350399, and those agents disclosed on page 1141, etc. in October Issue of Journal of Japan Chemical Society, 1992.

<Reflective Layer>

A reflective layer is formed on the recording layer in order to improve the reflectivity upon reproducing information. With respect to a light reflective substance used for the reflective layer, substances which have a high reflectivity of not less than 70% with respect to laser light may be used, and examples thereof include metal and semi-metal, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, or stainless steel. These materials may be used alone, or two or more kinds of these may be used in combination as an alloy. The reflective layer may preferably contain either Au or Ag, and the higher the content the more preferable.

The light reflective layer may be formed on the substrate, for example, by vapor-depositing, sputtering or ion-plating the above-mentioned reflective substance thereon. The layer thickness of the reflective layer is generally set in the range of from 10 to 800 nm, preferably, 20 to 500 nm, more preferably 50 to 300 nm.

<Other Layers>

With respect to the substrate, in addition to the above-mentioned recording layer and reflective layer, a layer such as a heat-resistant protective layer (sputter layer) may be formed on one surface or both of the surfaces of the reflective layer.

Dummy Substrate

In the invention, with respect to the dummy substrate, not particularly limited, any substrate may be used as long as it has a light-transmitting property and the same material as the recording substrate may be used. With respect to preferable materials, polycarbonate and cellulose triacetate may be used. Moreover, those materials having a moisture-absorbing rate of not more than 5% are more preferably used in the environment of 23° C., 50% RH.

EXAMPLES

Example 1

First, a resin substrate having a spiral groove (100 nm in depth, 250 nm in width, 500 nm in track pitch) on each of the two faces, made of polycarbonate resin (made by Teijin Limited; tradename: PANLIGHT AD5503), was manufactured through an injection-molding process. The thickness of this substrate was 1.2 mm with an outer diameter of 80 mm.

Next, an Ag film having a thickness of 100 nm is formed on each of the two faces through a DC magnetron sputtering process.

Here, 95 mass % of orasol blue GN (phthalocyanine: 0.07 ciba in light-absorbing degree, made by Ciba Specialty Chemicals Inc.) and 5 mass % of orasol blue BL (anthraquinone: 0.06 ciba in light-absorbing degree, made by Ciba Specialty Chemicals Inc.) were mixed into 2,2,3,3-tetrafluoropropanol, and dissolved by using an ultrasonic vibration machine (1800 W) in two hours to prepare a recording-layer forming solution, and the recording-layer forming solution thus prepared was put into a container (500 mm×200 mm, 200 mm in depth). Here, the dye concentration was set to 2 mass % with respect to the solvent in the recording-layer forming solution.

The substrate manufactured as described above was fitted to a panel having approximately 120 mm in square with an even thickness (approximately 1.5 mm), and this was immersed into the recording-layer forming solution vertically with the upper portion of the panel being held, and raised at a rate of 1 mm/s, and dried. At this time, the operation was carried out in a glove box at 25° C. with an atmospheric concentration of the solvent (2,2,3,3-tetrafluoropropanol) being set to 70%. After the drying process, this was heated at 60° C. for 2 hours so that the residual solvent was evaporated.

Next, a UV-curing resin (made by Dainippon Ink and Chemicals, Incorporated, trade name: SD347) was applied onto the recording layer by spin coating with the number of revolutions being set to 60 to 300 rpm, and a polycarbonate sheet (Pure Ace: 70 μm in film thickness, made by Teijin Limited.) was superposed thereon; then, after a bonding agent had been spread over the entire surface thereof while the number of revolutions being varied from 300 to 4000 rpm, this was irradiated with ultraviolet rays through an ultraviolet-ray irradiation lamp, and cured. These processes were carried out on both of the surfaces thereof to prepare a sample A.

Example 2

The same processes as Example 1 were carried out except that the dye concentration of the recording-layer forming solution was set to 1 mass % with a raising rate being set to 3 mm/s, to prepare a sample B.

Example 3

The same processes as Example 1 were carried out except that the dye concentration of the recording-layer forming solution was set to 0.5 mass % with a raising rate being set to 5 mm/s, to prepare a sample C.

Example 4

The same processes as Example 1 were carried out except that the dye concentration of the recording-layer forming solution was set to 0.5 mass % with a raising rate being set to 1 mm/s, to prepare a sample D.

The same processes as Example 1 were carried out except that the dye concentration of the recording-layer forming solution was set to 5 mass % with a raising rate being set to 1 mm/s, to prepare a sample E.

Evaluation

<Coating-Drying Time>

The time required for the substrate face to dry after having been raised from the coating solution was measured.

<Surface State>

The coated state of the dye on the substrate face was visually observed, and evaluated in the following manner.

It was observed as virtually an even coated surface: O

Fine irregularities occurred: Δ

Irregularities occurred: X

<Recording-Reproduction Test>

With respect to the samples A to E obtained as described above, a DDU-1000 (made by Pulstec Industrial Co., Ltd.), provided with a laser of 405 nm, was used to record 3T–14T signals thereon so that the modulation factor thereof was measured as a whole.

Table 1 shows the results of the measurements.

TABLE 1

| | Solution Concentration (%) | Raising Rate (mm/s) | Coating-Drying Time (sec) | Surface State | Modulation Factor (%) |
|---|---|---|---|---|---|
| Example 1 | 2 | 1 | 25 | O | 50 |
| Example 2 | 1 | 3 | 24 | O | 52 |
| Example 3 | 0.5 | 5 | 26 | O | 51 |
| Example 4 | 0.5 | 1 | 30 | O | 45 |
| Example 5 | 5 | 1 | 21 | O | 52 |

As clearly shown by Table 1, in samples A to E of examples 1 to 5, it was possible to form a recording layer evenly without irregularities, and in the recording and reproducing tests also, the modulation factor was set to approximately 50%, thereby indicating that the samples are put into practical use sufficiently.

As described above, in accordance with the method of manufacturing the optical information recording medium of the invention, it becomes possible to efficiently prepare an optical information recording medium having recording layers on both of the surfaces thereof in a stable manner.

What is claimed is:

1. A method of manufacturing an optical information recording medium, the method comprising the steps of:

immersing a substrate having guide grooves formed on both surfaces thereof into a recording-layer forming solution;

raising the substrate from the recording-layer forming solution; and dying the substrate thus raised to form recording layers on both of the surfaces of the substrate, wherein the substrate is subjected to the immersing, raising and drying processes while being held in a panel which can house a plurality of subtrates and wherein the panel has a guide groove extending to an end of the panel directing recording-layer forming solution outside the panel.

2. The method of claim 1, wherein the substrate has a diameter of not more than 80 mm.

3. The method of claim 1, wherein the raising and drying processes are carried out in a solvent atmosphere of the recording-layer forming solution.

4. The method of claim 3, wherein a concentration of the solvent atmosphere is 0.1 to 90%.

5. The method of claim 1, wherein a raising speed of the substrate is not more than 10 mm/s.

6. The method of claim 1, wherein the recording-layer forming solution contains an organic pigment in an amount of not more than 10 mass % with respect to a solvent.

7. The method of claim 6, wherein the organic pigment is selected from the group consisting of triazole, triazine, cyanine, merocyanine, aminobutadiene, phthalocyanine, cinnamic acid, viologen, azo, oxonole, benzoxazole, benztriazole and anthraquinone.

8. The method of claim 1, wherein the substrate contains at least one material selected from the group consisting of glass, polycarbonate, acrylic resin, vinylchloride-based resin, epoxy resin, amorphous polyolefin and polyester.

9. The method of claim 1, wherein a substrate has a thickness in a range of 0.7 to 1.3 mm.

10. The method of claim 1, wherein a solvent of the recording-layer forming solution is selected from the group consisting of methanol, ethanol, isopropyl alcohol, octafluoropentanol, allyl alcohol, methylcellosolve, ethylcellosolve, tetrafluoropropanol, hexane, heptane, octane, decane, cyclohexane, methyl cyclohexane, ethyl cyclohexane, dimethyl cyclohexane, toluene, xylene, benzene, carbon tetrachloride, chloroform, tetrachloroethane, dibromoethane, diethyl ether, dibutyl ether, diisopropyl ether, dioxane, acetone, 3-hydroxy-3-methyl-2-butanone, ethyl acetate, methyl lactate and water.

11. The method of claim 1, wherein the recording layer contains a binder selected from the group consisting of gelatin, cellulose derivatives, dextran, rosin, rubber, polyurethane, polyethylene, polypropylene, polystyrene, polyisobutylene, polyvinyl chloride, polyvinylidene chloride, a copolymer of polyvinyl chloride-polyvinyl acetate, polymethyl acrylate, polymethyl methacrylate, polyvinyl alcohol, chlorinated polyethylene, epoxy resin, butyral resin, rubber derivatives and phenol-formaldehyde resin.

12. The method of claim 11, wherein the recording layer contains an organic pigment and the binder is in an amount of 0.2 to 20 parts by mass with respect to 100 parts by mass of the organic pigment in the recording layer.

13. The method of claim 1, further comprising the step of forming a reflective layer on each of the both surfaces of the substrate having guide grooves formed thereon by a sputtering method or an ion-plating method.

14. The method of claim 13, wherein the reflective layer contains at least one kind of light-reflective substance selected from the group consisting of Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and stainless steel.

15. The method of claim 13, wherein the reflective layer has a thickness in a range of 20 to 500 nm.

16. The method of claim 1, further comprising the steps of:

laminating dummy substrates on both of the surfaces of the substrate having the recording layers formed thereon, to form a disc laminated body; and irradiating the disc laminated body with ultraviolet rays so that the substrate having the recording layers formed thereon and the dummy substrates are bonded to each other.

17. The method of claim 16, wherein the dummy substrate contains at least one of polycarbonate and cellulose triacetate.

18. The method of claim 13, further comprising the step of forming a heat-resistant protective layer on a surface of at least one of the reflective layers.

19. The method of claim 1, wherein the substrates are installed on a first stage and a second stage from the top of the panel.

* * * * *